Patented Dec. 27, 1949

2,492,928

UNITED STATES PATENT OFFICE 2,492,928

CELLULOSE DERIVATIVES

David S. Breslow, Wilmington, Del., assignor to Hercules Powder Company, Wilmington, Del., a corporation of Delaware No Drawing. Application December 22, 1948, Serial No. 66,842

11 Claims. (Cl. 260—100)

This invention relates to new cellulose derivatives and more particularly to cellulose esters of a stabilized rosin carbamic acid.

Cellulosic textile materials have been treated with certain aliphatic isocyanates to render them water-repellent or to increase their affinity for acid dyestuffs. Cellulosic textiles have also been flameproofed by treating them with halogenated aromatic isocyanates. In all of these treatments, only a surface reaction is involved, the cellulosic fabric retaining its structure, appearance, and even its feel. It has also been proposed to react cellulose with aliphatic or aromatic isocyanates in the presence of a tertiary base whereby carbamic acid esters are obtained. However, these products are insoluble in most organic solvents and having properties similar to cellulose esters in general are used only as substitutes for the latter. It has also been proposed to react cellulose esters such as cellulose acetate with phenyl isocyanate in order to produce an acetone-soluble derivative. In a copending application of Ronald Rosher, Serial No. 57,625, filed October 30, 1948, it is disclosed that an alcohol may be reacted with the isocyanate of a stabilized rosin acid to form a carbamate.

Now in accordance with this invention it has been found that resinous cellulose derivatives may be prepared by reacting cellulose or any of its derivatives which contain unreacted hydroxyl groups with the isocyanate of a stabilized rosin acid. These new cellulose esters of a stabilized rosin carbamic acid are valuable resins having the desirable properties of cellulose coupled with those of the stabilized rosin nucleus. In addition to their resinous properties, they exhibit solubilities in organic solvents not found in the prior art cellulose carbamates.

The following examples illustrate the preparation of the cellulose esters of stabilized rosin carbamic acids in accordance with this invention. All parts and percentages are by weight unless otherwise indicated.

Example 1

A suspension of 16 parts of hydroxyethyl cellulose containing 33.9% hydroxyethoxyl (1.19 groups per glucose unit) in 130 parts of benzene was agitated and about 90 parts of the benzene distilled off in order to dry the cellulose derivative. To the dried mixture was added 200 parts of anhydrous pyridine and 62 parts of dehydrogenated rosin isocyanate. The reaction mixture was agitated and heated at 60° C. for 84 hours and then was refluxed for 24 hours whereby a cloudy solution was obtained. The cellulose rosin carbamate was precipitated by pouring the solution into a large excess of isopropanol. The fibrous mass was filtered, and the fibers purified by twice dissolving in an 80:20 mixture of benzene and ethanol and reprecipitating by pouring this solution into isopropanol. The hydroxyethyl cellulose dehydrogenated rosin carbamate so obtained amounted to 65 parts and was a brittle, fibrous, tan mass containing 3.40% nitrogen which indicates a degree of substitution of 2.15 carbamate groups per glucose unit. The carbamate was resinous in character, had a drop softening point of 174° C. and an intrinsic viscosity of 0.47 in an 80:20 mixture of benzene and ethanol. It was soluble in benzene, the benzene-ethanol mixture, n-butyl acetate, methylene chloride, and pyridine and was insoluble in water, methanol, hexane, acetone and isopropanol.

Example 2

A mixture of 20 parts of a high viscosity methyl cellulose containing 30.2% methoxyl (1.83 methoxyl groups per glucose unit) and 100 parts of benzene was agitated and about 75 parts of the benzene distilled off in order to dry the cellulose derivative. To the dried mixture was added 93.5 parts of dehydrogenated rosin isocyanate and 200 parts of anhydrous pyridine. The reaction mixture was agitated and heated at 60° C. for 48 hours in an atmosphere of nitrogen. The resulting clear, tan, viscous solution was then refluxed for 24 hours, after which it was diluted with 200 parts of benzene and the thinned solution was poured into a large volume of hexane. The carbamate precipitated as a sticky precipitate which became granular on standing in hexane overnight. The carbamate was purified by twice dissolving in an 80:20 benzene-ethanol mixture and reprecipitating by adding the solution to hexane. The methyl cellulose dehydrogenated rosin carbamate obtained amounted to 50 parts and was a white, fibrous mass containing 2.86% nitrogen which indicates a degree of substitution of 1.0 carbamate group per glucose unit. The carbamate was resinous in character, had a drop softening point of about 217° C. and an intrinsic viscosity of 1.2 in benzene. It was soluble in benzene, n-butyl acetate, methylene chloride, pyridine, and an 80:20 mixture of benzene and ethanol. It was insoluble in water, methanol, and hexane.

Example 3

Eight parts of wood pulp (ground to 20 mesh)

was dried by solvent exchange once with anhydrous ethanol and three times with benzene. The fibers were then mixed with 300 parts of pyridine and 65 parts of dehydrogenated rosin isocyanate and the mixture was heated for 16 hours, 25 parts of triethylamine were then added and the mixture was refluxed for 48 hours. The reaction mixture was then diluted with 1000 parts of hexane and the fibers were filtered off, washed with hexane and dried. The amount of the fibers had increased to 14 parts, indicating that only a low degree of substitution had been obtained.

The above-treated fibers were then agitated with a 5% aqueous sodium hydroxide solution containing a small amount of sulfated lauryl alcohol as a wetting agent. The fibers were then filtered and dried by adding benzene and distilling off the major portion of the benzene. The dried fibers were refluxed with 250 parts of pyridine and 65 parts of dehydrogenated rosin isocyanate, the mixture becoming an exceedingly viscous solution within 30 minutes. Heating of the reaction mixture was continued for 40 hours, an additional 20 parts of dehydrogenated rosin isocyanate was added and the mass was heated for another 24 hours. The cloudy solution was poured into a large excess of hexane, but no precipitate was formed. The solvent was removed by steam distillation and the tan, brittle product was washed with hexane. It was swollen by the hexane but did not dissolve. The carbamate was purified by dissolving in a 10:1 mixture of methylene chloride and methanol, removing the solvent by steam distillation, redissolving the carbamate in an 80:20 benzene-ethanol mixture and finally precipitating it by pouring the latter solution into methanol. The cellulose dehydrogenated rosin carbamate so obtained was a white, brittle fibrous product amounting to 31 parts and contained 3.85% nitrogen, indicating a degree of substitution of 3.1 carbamate groups per glucose unit. It had an intrinsic viscosity of 1.6 in benzene, was soluble in benzene, n-butyl acetate, methylene chloride, pyridine, an 80:20 mixture of benzene and ethanol and a 90:10 mixture of hexane and isopropanol. It was insoluble in water, methanol and acetone.

The new cellulose resins of this invention may be prepared from cellulose or any of its partially substituted derivatives as, for example, any cellulose ether or ester which contains unreacted cellulosic hydroxyl groups. Exemplary of the cellulose derivatives containing free hydroxyl radicals which may be used in place of cellulose itself are the partially substituted alkyl ethers such as methyl cellulose, ethyl cellulose, etc., substituted alkyl ethers such as the hydroxyalkyl ethers like hydroxymethyl cellulose, hydroxyethyl cellulose, etc., the alkoxyalkyl ethers like methoxymethyl cellulose, methoxyethyl cellulose, etc., and the partially substituted esters such as cellulose acetates, cellulose propionate, cellulose butyrate, etc.

In accordance with this invention cellulose or its derivatives are reacted with a stabilized rosin isocyanate to produce a cellulose ester of a stabilized rosin carbamic acid. By the term "stabilized rosin isocyanate" is meant the isocyanate of a stabilized rosin acid; i. e., those rosins having the hydrocarbon nucleus of dehydroabietic acid, dihydroabietic acid, tetrahydroabietic acid, polyabietic acid, or the corresponding pimaric acid derivatives. Thus, the new cellulose esters of a stabilized rosin carbamic acid may also be defined as N-substituted cellulose carbamates in which the N-substituent is —CH₂R where R is the hydrocarbon radical of a stabilized rosin acid. Of particular importance are the cellulose carbamates prepared by reacting cellulose, or partially substituted derivatives thereof, with dehydrogenated or disproportionated rosin isocyanate, and hydrogenated rosin isocyanate. Instead of using the commercial rosin isocyanates, the pure isocyanates; namely, dehydroabietyl isocyanate, dihydroabietyl isocyanate, tetrahydroabietyl isocyanate, etc., may be used.

The rosin isocyanates, used to prepare the new cellulose resins, may be prepared by reacting the amine of a stabilized rosin or the hydrohalide salt thereof with phosgene. Any stabilized rosin amine may be used as, for example, dehydrogenated or disproportionated rosin amine, hydrogenated rosin amine, polymerized rosin amine, etc. Instead of the commercial rosin amines, the pure compounds may be reacted as, for example, dehydroabietyl amine, hydroabietyl amine, etc., in which case a pure isocyanate is obtained. The rosin isocyanates are readily prepared by passing phosgene into a solution of the rosin amine or the hydrohalide salt thereof in an inert solvent such as petroleum hydrocarbons, aromatic hydrocarbons, and halogenated hydrocarbons, at a temperature of from about 50° C. to about 200° C. The isocyanate may then be separated from the reaction mixture by removal of the solvent and distillation of the residue. These isocyanates are pale yellow to colorless, viscous liquids which may be distilled at subatmospheric pressures.

The reaction between the cellulose or the derivatives thereof containing unreacted cellulosic hydroxyl groups and the stabilized rosin isocyanate may be represented as follows:

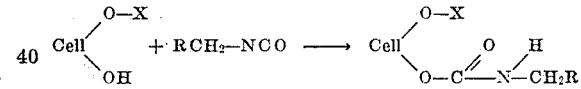

where X may be hydrogen, alkyl, hydroxyalkyl, alkoxyalkyl, or acyl and R is the hydrocarbon radical of a stabilized rosin acid; i. e., where the RCH₂—group is a dehydroabietyl or a hydroabietyl (either di- or tetra-hydro) radical, etc. The number of carbamate groups per glucose unit in the cellulose molecule in these products will depend upon the number of free hydroxyl groups per glucose unit in the starting cellulosic material and the quantity of stabilized rosin isocyanate utilized in carrying out the reaction. Thus, if free cellulose is used as the starting material, up to 3 carbamate groups may be substituted per glucose unit. On the other hand, if a cellulose derivative, already partially substituted, is used the maximum number of carbamate groups in the final product will be correspondingly less unless the substituent group itself contains free hydroxyl groups. For example, if the starting cellulosic compound is a hydroxyalkyl cellulose, the rosin isocyanate may react with either or both the free hydroxyl groups of the cellulose and the hydroxyl groups of the hydroxyalkyl groups.

The reaction between the cellulose or cellulose derivative and the rosin isocyanate is preferably carried out in the presence of an organic liquid diluent and a catalyst for the reaction, and preferably in a medium in which the product formed is soluble. Since tertiary amines are solvents for the cellulose rosin carbamates and at the same time catalyze the reaction, such amines as pyridine and trialkylamines are the preferred media for the reaction. If desired, the tertiary amine used to catalyze the reaction may be diluted with an inert solvent, especially if it is a solvent for the starting material and the product. Solvents which may be used to dilute the tertiary amine are benzene, toluene, dioxane, methylene chloride, ethylene chloride, ethyl acetate, butyl acetate, etc. The cellulosic material is preferably dried by solvent exchange, azeotropic distillation, etc., before the addition of the isocyanate. Any form of cellulose may be used as, for example, wood pulp, cotton linters, etc., or any form of cellulose derivative as, for example, either high- or low-viscosity cellulose ethers, etc. The temperature at which the reaction is carried out may be varied from about 20° C. to about 200° C. and preferably is from about 60° C. to about 100° C. The cellulose rosin carbamate is readily separated from the reaction mixture by the addition of a nonsolvent or by any other convenient means.

The cellulose rosin carbamates prepared in accordance with this invention have high molecular weights and are white to light-colored, brittle fibers which, in the case of those prepared from partially substituted cellulose ethers, are resinous in nature. The latter carbamates are particularly outstanding in that they are compatible with other film-formers and resins as, for example, raw linseed oil, ester gum, maleic-modified ester gum, pentaerythritol ester of rosin, maleic-modified pentaerythritol ester of rosin, etc. and consequently are of value in the preparation of varnishes, floor coverings, print paints and as modifiers for other resins in these and other applications. Unlike other cellulose esters, the cellulose rosin carbamates have an outstanding resistance to hydrolysis, especially acid hydrolysis and, therefore, may be used in many applications in which ordinary cellulose esters may not be used.

What I claim and desire to protect by Letters Patent is:

1. A cellulose ester of a stabilized rosin carbamic acid.
2. A cellulose mixed ester of a stabilized rosin carbamic acid and a saturated aliphatic acid.
3. A cellulose ether ester of a stabilized rosin carbamic acid.
4. The cellulose ester of a stabilized rosin carbamic acid.
5. A cellulose ester of a dehydrogenated rosin carbamic acid.
6. A cellulose ester of a hydrogenated rosin carbamic acid.
7. A cellulose ether ester of a dehydrogenated rosin carbamic acid.
8. The cellulose ester of dehydrogenated rosin carbamic acid.
9. An ester of a methyl cellulose containing unreacted hydroxyl groups and dehydrogenated rosin carbamic acid.
10. An ester of a hydroxyethyl cellulose containing unreacted cellulose hydroxyl groups and dehydrogenated rosin carbamic acid.
11. The process of preparing a cellulose ester of a stabilized rosin carbamic acid which comprises reacting a cellulosic compound containing a free hydroxyl group with a stabilized rosin isocyanate.

DAVID S. BRESLOW.

No references cited.